US009086926B2

(12) United States Patent
Dominick et al.

(10) Patent No.: US 9,086,926 B2
(45) Date of Patent: Jul. 21, 2015

(54) OPERATION OF A DATA PROCESSING NETWORK HAVING A PLURALITY OF GEOGRAPHICALLY SPACED-APART DATA CENTERS

(75) Inventors: Lutz Dominick, Eggolsheim (DE); Karlheinz Dorn, Kalchreuth (DE); Vladyslav Ukis, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 635 days.

(21) Appl. No.: 13/419,833

(22) Filed: Mar. 14, 2012

(65) Prior Publication Data

US 2012/0239734 A1    Sep. 20, 2012

(30) Foreign Application Priority Data

Mar. 15, 2011    (EP) .................................... 11158252

(51) Int. Cl.
 *H04L 29/08* (2006.01)
 *G06F 9/50* (2006.01)
 *H04L 29/06* (2006.01)

(52) U.S. Cl.
 CPC .............. *G06F 9/505* (2013.01); *G06F 9/5033* (2013.01); *G06F 9/5083* (2013.01); *H04L 67/1002* (2013.01); *H04L 67/1021* (2013.01); *H04L 67/18* (2013.01); *H04L 67/38* (2013.01)

(58) Field of Classification Search
 None
 See application file for complete search history.

(56) References Cited

U.S. PATENT DOCUMENTS 7,203,944 B1 *  4/2007 van Rietschote et al. ..... 718/104
7,941,556 B2    5/2011 Canali et al.
8,407,182 B1 *  3/2013 Rajaa et al. .................... 707/610
8,417,938 B1 *  4/2013 Considine et al. ............ 713/151
8,533,103 B1 *  9/2013 Certain et al. ................. 705/37
8,612,330 B1 * 12/2013 Certain et al. ................. 705/37

(Continued)

FOREIGN PATENT DOCUMENTS

EP    1703693 A1    9/2006

OTHER PUBLICATIONS

Fang Hao et al.: "Enhancing Dynamic Cloud-based Services using Network Virtualization", vol. 40, No. 1, Jan. 2010, pp. 67-74, Computer Communication Review, XP002652789, ACM USA, ISSN: 0146-4833; Others; 2010.

(Continued)

*Primary Examiner* — Ario Etienne
*Assistant Examiner* — Ho Shiu
(74) *Attorney, Agent, or Firm* — Harness, Dickey & Pierce, P.L.C.

(57) ABSTRACT

A method and a device are disclosed for operating a data processing network which includes a plurality of geographically spaced-apart data centers and a large number of client computers, data being transmittable between each of the client computers and at least to one of the data centers, wherein one or more virtual servers is operateable in each of the data centers. According to at least one embodiment, access data is collected including information on geographical location of the client, geographical location of the virtual servers and the degree of utilization of the virtual servers. The access data collected is analyzed and, using the result of analysis, a migration plan, which is improved with respect to the mean latency, is created for the deployment of the virtual servers among the data centers. The virtual servers are migrated between the data centers in accordance with the migration plan.

13 Claims, 6 Drawing Sheets

(56) References Cited

U.S. PATENT DOCUMENTS

| | | | |
|---|---|---|---|
| 8,694,400 B1* | 4/2014 | Certain et al. | 705/35 |
| 2005/0108712 A1* | 5/2005 | Goyal | 718/100 |
| 2006/0069761 A1* | 3/2006 | Singh et al. | 709/222 |
| 2006/0190602 A1 | 8/2006 | Canali et al. | |
| 2007/0179991 A1* | 8/2007 | Burnett et al. | 707/201 |
| 2008/0184229 A1* | 7/2008 | Rosu et al. | 718/1 |
| 2008/0201479 A1* | 8/2008 | Husain et al. | 709/227 |
| 2008/0201711 A1* | 8/2008 | Amir Husain | 718/1 |
| 2008/0222375 A1* | 9/2008 | Kotsovinos et al. | 711/162 |
| 2009/0006486 A1* | 1/2009 | Burnett et al. | 707/200 |
| 2009/0144393 A1* | 6/2009 | Kudo | 709/218 |
| 2009/0172125 A1* | 7/2009 | Shekhar et al. | 709/215 |
| 2009/0228589 A1* | 9/2009 | Korupolu | 709/226 |
| 2009/0228726 A1* | 9/2009 | Malik et al. | 713/320 |
| 2010/0011368 A1* | 1/2010 | Arakawa et al. | 718/104 |
| 2010/0274890 A1* | 10/2010 | Patel et al. | 709/224 |
| 2010/0299618 A1* | 11/2010 | Pare | 715/757 |
| 2010/0322255 A1* | 12/2010 | Hao et al. | 370/398 |
| 2011/0119388 A1* | 5/2011 | Attanasio et al. | 709/227 |
| 2011/0119748 A1* | 5/2011 | Edwards et al. | 726/12 |
| 2011/0142053 A1* | 6/2011 | Van Der Merwe et al. | 370/395.1 |
| 2011/0153831 A1* | 6/2011 | Mutnuru et al. | 709/226 |
| 2011/0167421 A1* | 7/2011 | Soundararajan et al. | 718/1 |
| 2011/0282986 A1* | 11/2011 | Phaal | 709/224 |
| 2011/0307889 A1* | 12/2011 | Moriki et al. | 718/1 |
| 2011/0321041 A1* | 12/2011 | Bhat et al. | 718/1 |
| 2012/0005344 A1* | 1/2012 | Kolin et al. | 709/226 |
| 2012/0011254 A1* | 1/2012 | Jamjoom et al. | 709/226 |
| 2012/0016977 A1* | 1/2012 | Robertson et al. | 709/224 |
| 2012/0036251 A1* | 2/2012 | Beaty et al. | 709/224 |
| 2012/0066371 A1* | 3/2012 | Patel et al. | 709/224 |
| 2012/0131180 A1* | 5/2012 | Nomura et al. | 709/224 |
| 2012/0158807 A1* | 6/2012 | Woody et al. | 708/204 |
| 2012/0167081 A1* | 6/2012 | Sedayao et al. | 718/1 |
| 2012/0173813 A1* | 7/2012 | Mizuta et al. | 711/114 |
| 2012/0221744 A1* | 8/2012 | Heywood et al. | 709/247 |
| 2012/0226797 A1* | 9/2012 | Ghosh et al. | 709/224 |
| 2012/0290643 A1* | 11/2012 | Fok Ah Chuen et al. | 709/203 |
| 2012/0304175 A1* | 11/2012 | Damola et al. | 718/1 |
| 2013/0013732 A1* | 1/2013 | Machida | 709/217 |

OTHER PUBLICATIONS

Noah Dietrich et al.: "Load Balancing and Quality of Service constrained Framework for Distributed Virtual Environments", Proc. 2010, 6th Intern. Conf. on Collaborative Computing: Networking, Applications and Worksharing (Collaboratecom 2010), p. 10 pp., XP002652790, IEEE Biscataway, NJ, USA, ISBN: 978-963-9995-24-6; Others; 2010.

K. Bouyoucef et al.: "Optimal Allocation Approach of Virtual Servers in Cloud Computing", Proceedings of the 6th Euro-NF Conference on next Generation internt (NGI 2010), p. 6 pp., XP02652788, IEEE Piscataway, NJ, USA, ISBN: 978-1-4244-8167-5; Others; 2010.

European Search Report for European Application No. EP 11158252.4 (Not Yet Published).

\* cited by examiner

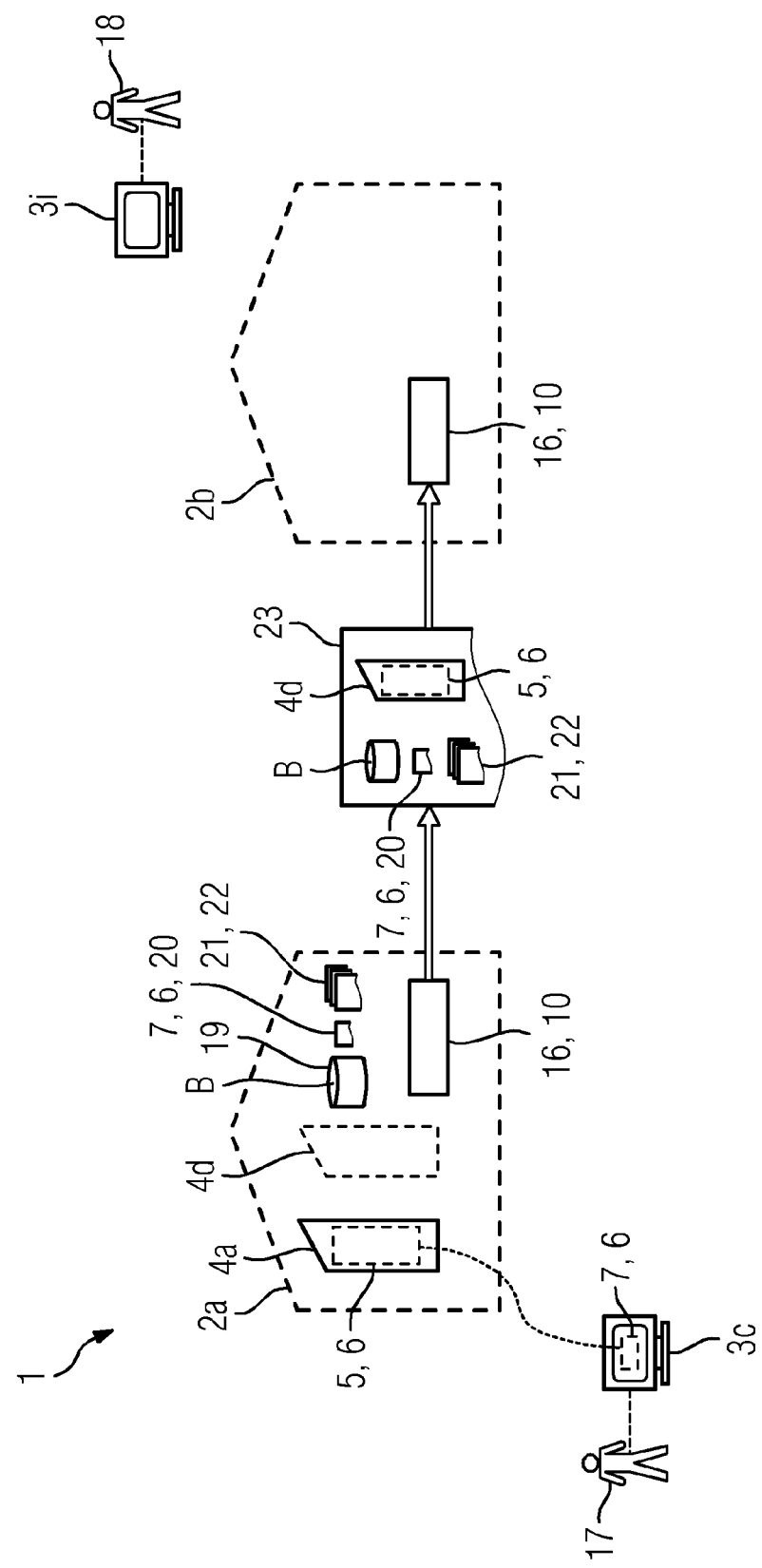

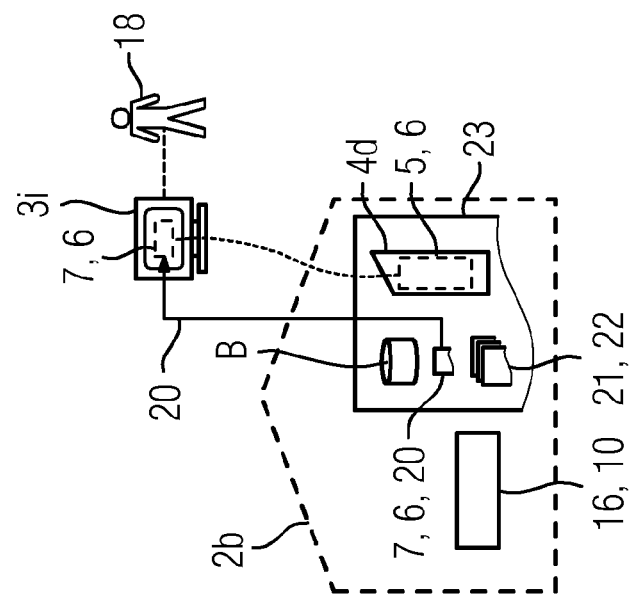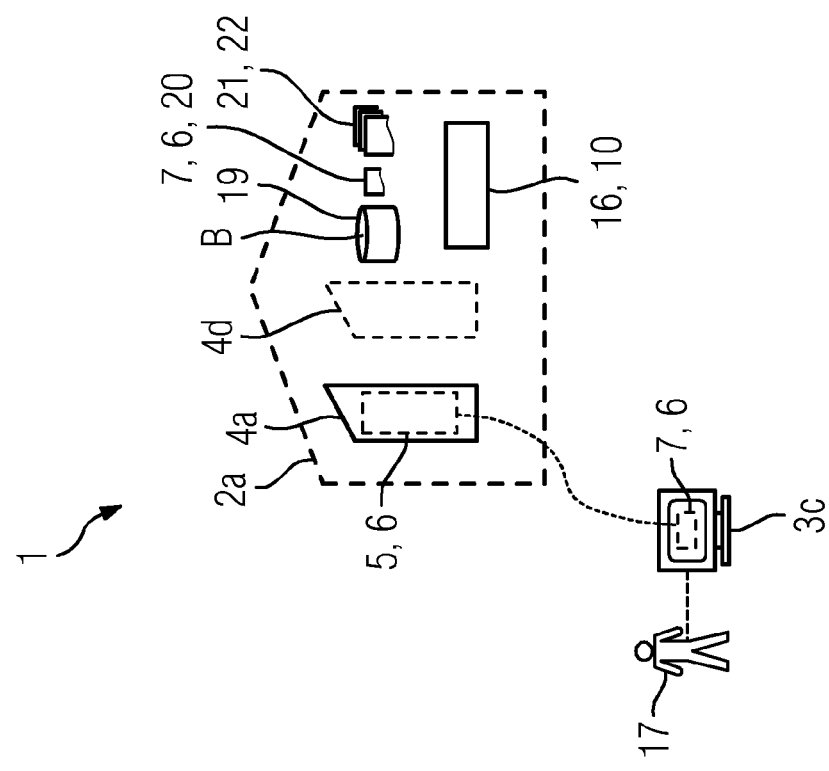

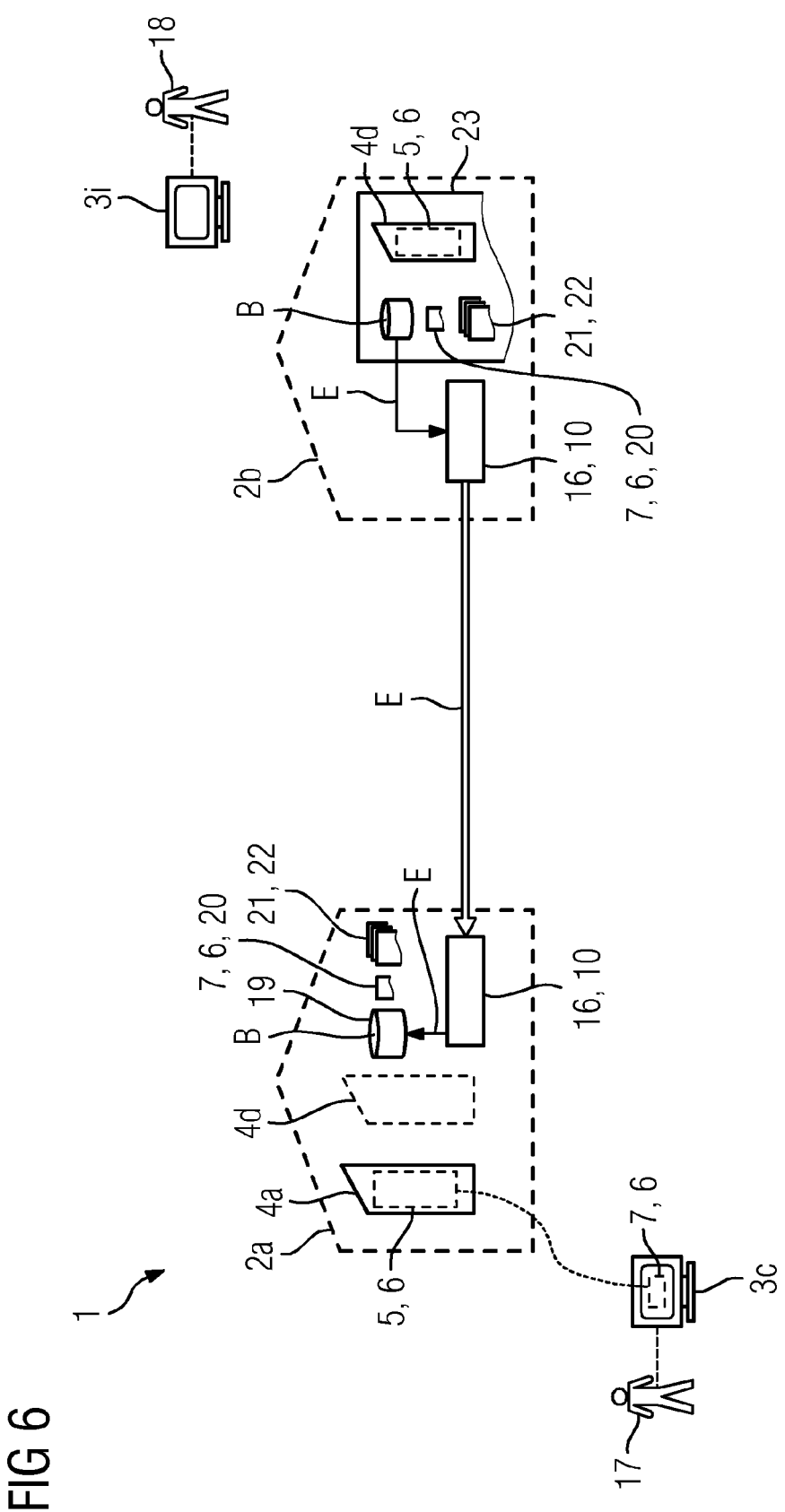

OPERATION OF A DATA PROCESSING NETWORK HAVING A PLURALITY OF GEOGRAPHICALLY SPACED-APART DATA CENTERS

PRIORITY STATEMENT

The present application hereby claims priority under 35 U.S.C. §119 to European patent application number EP 11158252.4 filed Mar. 15, 2011, the entire contents of which are hereby incorporated herein by reference.

FIELD

At least one embodiment of the invention generally relates to a method and/or to a device for operating a data processing network including a plurality of geographically spaced-apart data centers and including a large number of clients, i.e. client computers, which are connected so as to transmit data at least to one of the data centers respectively. In at least one embodiment, one or more virtual servers can be operated in each of the data centers, wherein an application backend module of a deployed software application is implemented on each virtual server, wherein an application frontend module of the software application is implemented on each of the clients, and wherein an application backend module for processing data processing requests (accesses) is allocated to each application frontend module.

BACKGROUND

Data processing networks are used in particular in modern medical technology. The (software) applications made available by the data centers are, by way of example, applications for displaying and diagnosing medical image data.

Within the framework of increasing networking and division of tasks in the medical sphere, medical applications are currently conventionally implemented on a multi-level basis and "distributed" (deployed) among a large number of clients on the one hand and one or more servers on the other hand. Here and below the components of such an application which are implemented by the client are called "(application) frontend modules" or "(application) frontends" for short. In a differentiation herefrom the components of the application which are implemented by a server are called "(application) backend modules" or "(application) backends" for short.

Recently there has increasingly been a tendency even in the medical sector to outsource servers and the application backends implemented thereon increasingly from the individual hospitals and other medical organizational structures to comprehensively organized data centers from where server-side hardware and software are made available as an external service within the framework of what is known as a 'cloud computing' concept.

The use of a data center allows flexible scalability of the available computing power in particular. Therefore, when deploying a medical application in a data center, a maximum number of virtual servers which can be started and operated simultaneously with each other is conventionally specified. A virtual server includes in this connection one instance of the backend of a deployed medical application respectively. The costs associated with operation of the application at the data center are usually calculated only on the basis of use, however, and are determined in particular by the number of virtual servers that are actually running simultaneously.

SUMMARY

The inventors have recognized that the use of data centers cannot prevent inefficiencies due to load variations (i.e. fluctuations in the required computing power) either, in particular in medical organizational structures with geographically widely distributed locations. This is due in particular to the fact that, firstly, a certain location, i.e. a certain data center, is permanently allocated to each virtual server according to the conventional organization of a data center or data center network and that, secondly, however, the load profile of the application implemented in one of the virtual servers often exhibits temporal and geographical variations. Such load variations can occur regularly or irregularly. There is therefore an increased power requirement for certain medical applications, for example typically during the respectively local winter season owing to the increased occurrence of illness that is associated therewith.

With global distribution of the clients allocated to a virtual server, the focus of the accesses can therefore sometimes change in a 12 month cycle between the northern hemisphere and the southern hemisphere. Irregular load variations can result due to the displacement of the field of activity of individual medical organizations, on the basis of which certain applications are cancelled or re-booked by this organization.

The inventors have recognized that the result of the described load variations, in the case of deployment of a medical application in one or more data centers, is that a considerable number of clients are often at least sometimes at a comparatively great geographical distance from the allocated virtual servers. This leads to high latencies in data transfer between the clients and the allocated servers and decreases the overall performance of the respective application. An excessively long latency also results from the fact that geographically close servers are often overloaded during local load peaks and therefore cannot react with sufficient speed to accesses by the clients.

High latencies due to overloading are also promoted in medical applications by the fact that these applications are often implemented on a multi-tenant basis. This is taken to mean that one and the same instance of such an application can service a plurality of "clients", i.e. organizations or parts of organizations, without these having access to the data, user administration or other information of the respective other "clients". Multi-tenancy usually leads to the load profiles of the individual "clients" mixing dynamically, without this being obvious to the individual "clients". Scaling planning is therefore not possible, or only possible with difficulty, for the individual organization.

The latency of a medical application is a decisive factor, however, for the productivity of medical organizational structures, so a requirement for significant improvement exists here.

At least one embodiment of the invention is directed to a method for operating a data processing network which allows effective operation of a (software) application deployed in this data processing network comparatively easily. At least one embodiment of the invention is also directed to a device capable of carrying out the method.

At least one embodiment is directed to a method. It is accordingly provided that access data about the interaction between the clients and the respectively allocated virtual servers is collected in a database. The access data in this connection includes information on the geographical locations from which clients access virtual servers. The access data also includes information on the geographical location and degree of utilization of the virtual servers. Information on the geographical location and degree of utilization of the called server is preferably gathered for each access by a client to a virtual server. As an alternative, however, it would also be conceivable to acquire information on the geographical location and degree of utilization of the virtual servers independently of the individual accesses.

With respect to the device provided for carrying out the method, the device accordingly comprises a number of monitoring modules and an (access) database. The monitoring modules are set up to collect the access data specified in more detail above, and to store it in the access database.

In one possible embodiment of the invention, a central monitoring module can be allocated to each data center. In an example embodiment the monitoring modules are implemented on the level of the virtual server, however. A monitoring module is therefore allocated to each virtual server in this embodiment. The monitoring module is integrated in the application backend in particular here, so the server migration is controlled by the application itself. By contrast the access database is preferably centrally organized and is supplied with access data from the monitoring modules of all internationally operated virtual servers of the data processing network.

Within the scope of an embodiment of the invention it may be provided within the context of the data processing network for a single workspace management module to be provided which centrally coordinates the data processing tasks. As an alternative to this a plurality of workspace management modules decentrally allocated to each data center or each virtual server may be provided.

The monitoring modules, analysis module, migration control modules and the optionally present workspace management module are software modules in an example embodiment of the invention.

BRIEF DESCRIPTION OF THE DRAWINGS

In the following detailed description, example embodiments, not to be understood in a limiting sense, together with their features and further advantages will be described with reference to the accompanying drawings in which:

FIGS. 3 to 6 show in a more simplified diagram the data processing network according to FIG. 1 in four successive method stages during execution of a data processing task passed from a client of a first data center to a remote client.

Figure 1:
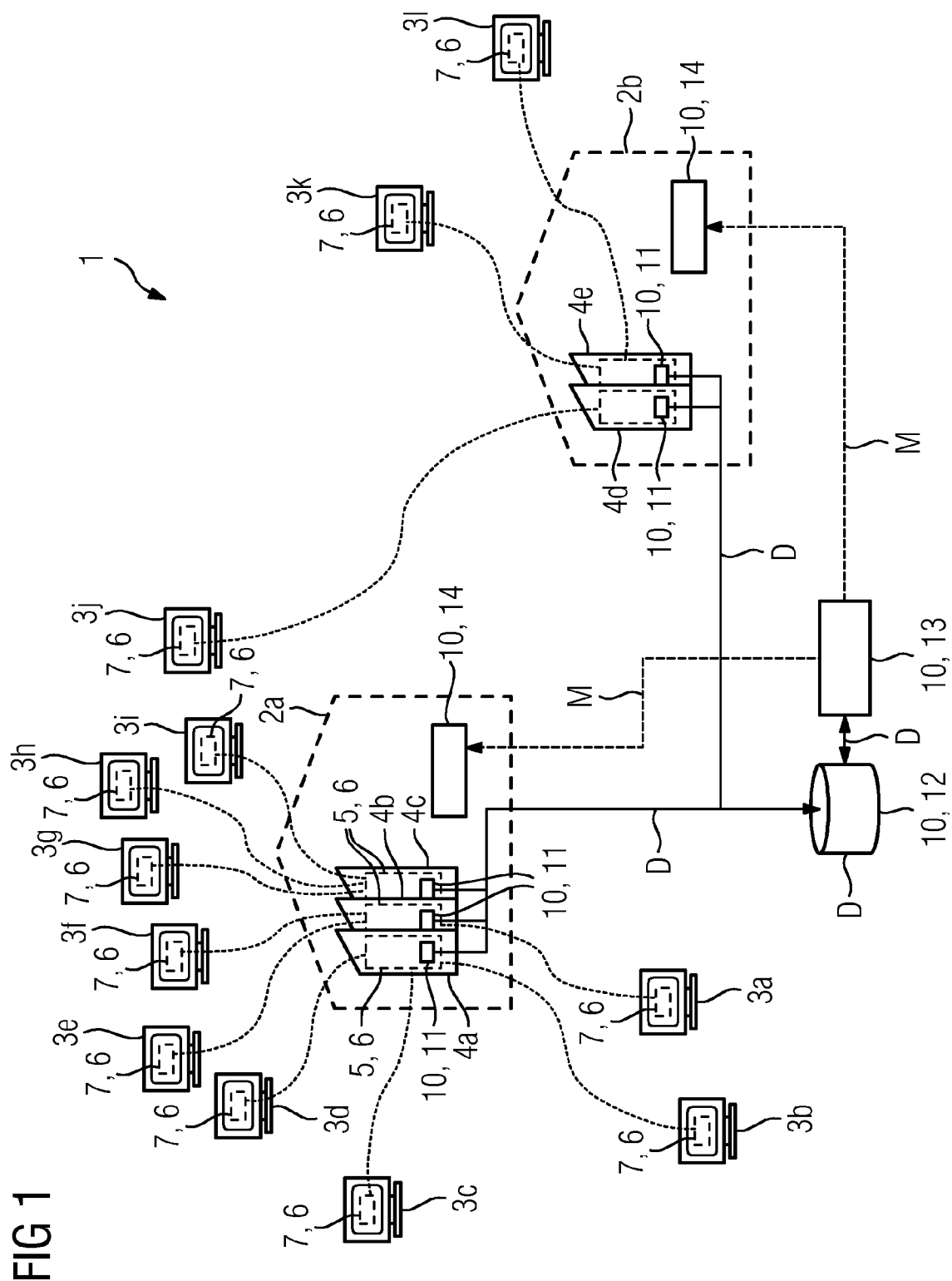
FIG. 1 shows in a schematically illustrated block diagram a data processing network with two data centers that are arranged geographically distanced from each other and in which a plurality of virtual servers are in each case operated using a backend of a medical software application implemented thereon in each case, and with a number of clients on which a frontend of the software application is implemented in each case, and with a device for operating this data processing network.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature. Mutually corresponding parts, sizes and structures are provided with identical reference characters in all figures.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

An embodiment is directed to a method. It is accordingly provided that access data about the interaction between the clients and the respectively allocated virtual servers is collected in a database. The access data in this connection includes information on the geographical locations from which clients access virtual servers. The access data also includes information on the geographical location and degree of utilization of the virtual servers. Information on the geographical location and degree of utilization of the called server is preferably gathered for each access by a client to a virtual server. As an alternative, however, it would also be conceivable to acquire information on the geographical location and degree of utilization of the virtual servers independently of the individual accesses.

The access data may be stored in the database asynchronously to the acknowledgement of the virtual server to the client in order not to affect client-server communication.

According to an embodiment of the invention, the access data collected in the database is automatically analyzed, in particular at regular intervals of, by way of example, 24 hours. Using the result of analysis a migration plan is automatically created which determines—optionally modified—deployment of the virtual servers among the data centers. The migration plan is in the process created according to the proviso that the mean latency is improved. According to the invention the virtual servers are finally migrated—in particular at regular intervals of, by way of example, 10 days—between the data centers in accordance with the migration plan. The virtual servers are preferably migrated online, i.e. during operation.

"Latency" (also "network latency") designates the period between the start of an access (in particular the sending of a data processing request by a client) and receipt of the server's acknowledgement at the client (in particular receipt of the processing result returned by the server) minus the computing time required by the server for processing the request.

"Access" or "data processing request" in general designates the calling up by a client of a function implemented by the server. Within the scope of at least one embodiment of the inventive method, it is preferably provided that access data is gathered with each access by a client to a virtual server. To reduce the volume of data associated with acquisition of the access data it may, however, alternatively be provided that only one sample of the (server) accesses initiated by a client and/or (server) accesses of only a selected subgroup of clients is taken into consideration.

In a refined embodiment of the method, the instant and/or duration of the access is gathered as access data in addition to the information stated above, and collected in the database. An item of information is also preferably acquired from which the identity of the called virtual server can be determined. In an expedient embodiment of the method, the number of users logged in with the called virtual server at this instant is acquired as information on the degree of utilization of the virtual servers.

To reduce or even minimize the latency, in an embodiment of the invention overloaded virtual servers are identified according to one variant of the method during the course of analysis of the access data collected in the database. In particular the number of clients or client users simultaneously logged in with the server is compared with a defined, recommended maximum number of simultaneously logged-in clients or client users for this purpose. Server overloading is detected if the recommended maximum number is exceeded. Data centers with an over-capacity of virtual servers (i.e. no or particularly few overloaded virtual servers) and data centers with an under-capacity of virtual servers (i.e. a particularly large number of overloaded servers) are also identified. Virtual servers are removed from data centers with over-capacity and allocated to data centers with under-capacity during creation of the migration plan.

To largely avoid noticeable latencies during data access, in one advantageous embodiment of the method the data allocated to a virtual server is always locally stored in the data center at which this virtual server is operated. If this virtual server is migrated from one data center to another data center when the migration plan is implemented, the allocated data is also automatically moved to the new data center. Data management is advantageously simplified in that a separate data register (also called a "data slice") is allocated to each virtual server in which the associated data is stored collected together with associated database information.

One method that is increasingly being employed in the diagnosis of medical image data in order to increase efficiency is what is referred to as "Night Hawk Reading". Here the image data produced during the day by a medical institution is purposefully assigned for diagnosis to a different location or a different institution which is situated in a different time zone, and which, as a result, can deal with the diagnostics during the nighttime of the instructing institution. Similar methods of operating, in which differentiated (data processing) tasks are to be executed at a location geographically far removed from the originator, can also be found in other medical and non-medical fields of application, however, by way of example if, in the case of a difficult medical diagnosis, an opinion of a medical specialist working on a different continent is to be obtained.

With such tasks it is often desirable in order to attain a consistent and, in the opinion of the originator, standard, work result and to avoid data incompatibilities for the remote data processing to take place with the device(s), in particular the software applications, which are available where the originator is located. On the other hand, long latencies should be avoided when assigning the task to the remote contractor, so connection of the contractor's client to the data center and the originator's virtual server operated thereon is frequently not possible.

To satisfy these opposing requirements equally when assigning tasks to removed contractors it is provided in a specific embodiment of the method that the data required for the task is collected and is compiled together with a virtual server and a backend implemented thereon of the or each application required for executing the task in a special data environment which is called a "workspace unit" or "workspace" for short here.

This workspace is then sent as a whole from the originator's data center to a different data center, which is closer, and in particular closest, to the or each of the contractor's clients. The sending data center is hereinafter also called an "instructing" data center while the receiving data center is also called an "instructed data center". The or each of the contractor's clients is called a "remote client" or an "instructed client".

The workspace therefore, in at least one embodiment, includes all of the software and other information which is necessary to carry out the or each application backend contained in the workspace in the instructed data center and to deal with the data processing task in the process.

In an expedient embodiment of the method, the virtual server contained in the workspace and the application backend implemented thereon are started following receipt of the workspace in the instructed data center. The contractor is instructed hereof by way of example by an automatically generated email. A client user working on the instructed client can now connect to the instructed data center and execute the data processing task. In the process it makes use of an application frontend implemented on the instructed client which communicates with the application backend contained in the workspace. Once the processing task has been executed a subsequent processing result is automatically sent back to the instructing data center. The virtual server contained in the workspace is preferably shut down by the instructed data center in response. The workspace is then expediently deleted by the instructed data center.

In a simple variant of an embodiment of the method, the application frontend is made available to the instructed client independently of the sending of the workspace. The application frontend must, by way of example, already be installed on the instructed client for the client user to be able to execute the task. In a deviation herefrom the or each application frontend required for executing the task is made available in the workspace in one development of an embodiment of the invention. The workspace contains the or each application frontend advantageously as a download file which can be downloaded onto the instructed client to execute the task. The application is preferably implemented as an Internet application in this connection, in which the application frontend can be executed without the need for installation in an Internet-enabled browser of the instructed client.

In a further variant of an embodiment of the method the workspace contains at least one configuration file, in addition to the or each application backend and optionally the or each associated application frontend, in which file the application presets available at the location of the originator are provided. With a medical application for the diagnosis of image data these presets include what are known as layouts in particular, which fix the number and arrangement of images displayed per study, and information on the functional scope and extent of the license of the application, etc. Additionally or alternatively the workspace optionally contains templates for medical reports and accounting information, information on preliminary and optionally follow-up examinations, etc.

The above-described bundling of the data required for a data processing task to be executed remotely and the software required for this in a workspace, the sending of the workspace to an instructed data center and the implementation there of the software for execution of the data processing task is regarded as an independent embodiment of an invention which can basically also advantageously be used independently of the remaining steps of the method described here.

With respect to the device provided for carrying out the method, the device accordingly comprises a number of monitoring modules and an (access) database. The monitoring modules are set up to collect the access data specified in more detail above, and to store it in the access database.

In one possible embodiment of the invention, a central monitoring module can be allocated to each data center. In an example embodiment the monitoring modules are implemented on the level of the virtual server, however. A monitoring module is therefore allocated to each virtual server in this embodiment. The monitoring module is integrated in the application backend in particular here, so the server migration is controlled by the application itself. By contrast the access database is preferably centrally organized and is supplied with access data from the monitoring modules of all internationally operated virtual servers of the data processing network.

For analyzing the access data collected in the access database the device of an embodiment comprises an analysis module which is expediently likewise implemented centrally at the location of the access database. The analysis module is set up to automatically carry out the above-described analysis of the access data and to automatically create a migration plan, which is improved with respect to the mean latency of the data processing network, for the deployment of the virtual servers among the data centers.

The device finally comprises as at least one device for migrating the virtual servers a number of migration control modules which are set up to migrate the virtual servers between the data centers in accordance with the migration plan. One migration control module is preferably allocated to each data center.

In a preferred development of an embodiment of the device the migration control modules are also set up to locally store the data allocated to each server in the data center allocated to the virtual server and, in the case of migration of the virtual server, to also move the allocated data to the new location of the virtual server.

In an expedient variant of an embodiment, the device also comprises a workspace management module. This workspace management module is set up to create a workspace according to at least one embodiment of the above-described method for the execution of a data processing task on a client geographically remote from the instructing data center, and to transmit this workspace to an (instructed) data center which is positioned closer to the instructed client.

Within the scope of an embodiment of the invention it may be provided within the context of the data processing network for a single workspace management module to be provided which centrally coordinates the data processing tasks. As an alternative to this a plurality of workspace management modules decentrally allocated to each data center or each virtual server may be provided.

The monitoring modules, analysis module, migration control modules and the optionally present workspace management module are software modules in an example embodiment of the invention.

FIG. 1 shows in a roughly schematic simplification a data processing network 1. The data processing network 1 is formed from two data centers 2a and 2b and from a large number of client computers (hereinafter called clients 3a to 3l). The data centers 2a and 2b are connected to each other and to the clients 3a to 3l (in a manner not shown) so as to transfer data, in particular via the Internet.

Like the clients 3a to 3l, the data centers 2a and 2b are geographically widely deployed. Data center 2a and clients 3a to 3j are stationed in North America, by way of example, while data center 2b and clients 3k and 3l are located in Europe.

A number of hardware servers is operated in each of the data centers 2a and 2b, on which a plurality of virtual servers 4a-4e are put down in each case. In the simplified example according to FIG. 1 the three virtual servers 4a to 4c are operated in data center 2a while the two virtual servers 4d and 4e are operated in data center 2b.

An instance of an (application) backend 5 of a medical software application 6 is executed in each virtual server 4a to 4e. An (application) frontend 7 of the application 6 is executed in each of clients 3a to 3l. The application 6, which is by way of example software for displaying and diagnosing digital, medical image data, is implemented as what is referred to as a Rich Internet Application (RIA). This means, firstly, that the frontends 7 of the application 6 are executable without the need for installation in a web browser installed on the respective client 3a to 3l. Secondly, this means that the frontends 7, at least as far as the functionality for displaying the medical data is concerned, can be operated without having to use server services. For numerically more complex actions, in particular for the employment of image processing algorithms (e.g. segmenting algorithms, image rotations, image flips, color changes, etc.) each of the frontends 7 resorts to one of the backends 5. For this purpose the clients 3a to 3l are connected in terms of data communication technology to one of the virtual servers 4a to 4e respectively. In the illustrated example clients 3b, 3c and 3d are connected to virtual server 4a, clients 3a, 3e and 3f to virtual server 4b, clients 3g, 3h and 3i to virtual server 4c, client 3j to virtual server 4d and clients 3k and 3l to virtual server 4e.

A device 10 is also allocated to the data processing network 1 for operation thereof. The device 10 comprises a number of monitoring modules 11 of which one respectively is integrated in each of the application backends 5. The device 10 also comprises an access database 12, an analysis module 13 and two migration control modules 14 of which one respectively is allocated to each of the two data centers 2a,2b. The monitoring modules 11, analysis module 13 and migration control modules 14 are software modules.

During operation of the data network 1 and the associated device 10 access data D relating to each access, with which one of the clients 3a to 3l accesses the respectively allocated virtual server 4a to 4e, or more precisely the backend 5 implemented thereon, is logged by the monitoring modules 11. The following are acquired for each access:
the geographical location of the calling client 3a to 3l,
the geographical location of the virtual server 4a to 4e,
the instant of access,
an identification number of the virtual server 4a to 4e,
the duration of access, and
the number of users logged-in with the called virtual server 4a to 4e.

The monitoring modules 11 file the acquired access data D in the access database 12 in the process.

The access data D stored in the access database 12 is analyzed with regard to the degree of utilization of the virtual servers 4a to 4e by the analysis module 13. The analysis module 13 compares the number of clients 3a to 3l or client users logged in to the respective server 4a to 4e as a mean and/or at peak load times with a maximum number of simultaneously logged-in users recommended by the application manufacturer. If the number of mean logged-in clients 3a to 3l exceeds the recommended maximum number significantly, the analysis module 13 identifies the relevant server 4a to 4e as being overloaded. The analysis module 13 also identifies data centers 2a,2b with over-capacity of virtual servers 4a to 4e and data centers 2a,2b with under-capacity of virtual servers 4a to 4e. In the illustrated example it is assumed that data center 2a has an under-capacity of virtual servers 4a to 4e, i.e. is overloaded therefore, while data center 2b has an over-capacity of virtual servers 4a to 4e.

On the basis of this analysis result the analysis module 13 creates a migration plan M which contains instructions on the optionally changed deployment of virtual servers 4a to 4e among data centers 2a and 2b. The analysis module 13 creates the migration plan M with the proviso that over- and under-capacities of the virtual servers 4a to 4e provided in data center 2a and 2b respectively are compensated as far as possible. In the illustrated case the migration plan M contains by way of example the instruction to remove virtual server 4d from data center 2b and allocate it to data center 2a.

The analysis module 13 sends the migration plan M to the respective migration control module 14 in the data centers 2a and 2b. The migration control modules 14 implement the migration plan M at fixed intervals of, by way of example, ten days respectively. During operation the virtual server 4d is migrated by the migration control module 14—as indicated in FIG. 2 by arrow 15—from data center 2b to data center 2a.

During migration the data, which is allocated to the virtual servers 4a to 4e to be migrated in each case, is always moved as well. In the illustrated example data of virtual server 4d is therefore transferred from data center 2b to data center 2a and stored locally there. The data is stored locally to the location in what is known as a "data slice" for this purpose. This is taken to mean a data organizational structure which, in addition to the data, also includes and manages associated database information, in particular access authorizations.

Figure 2:
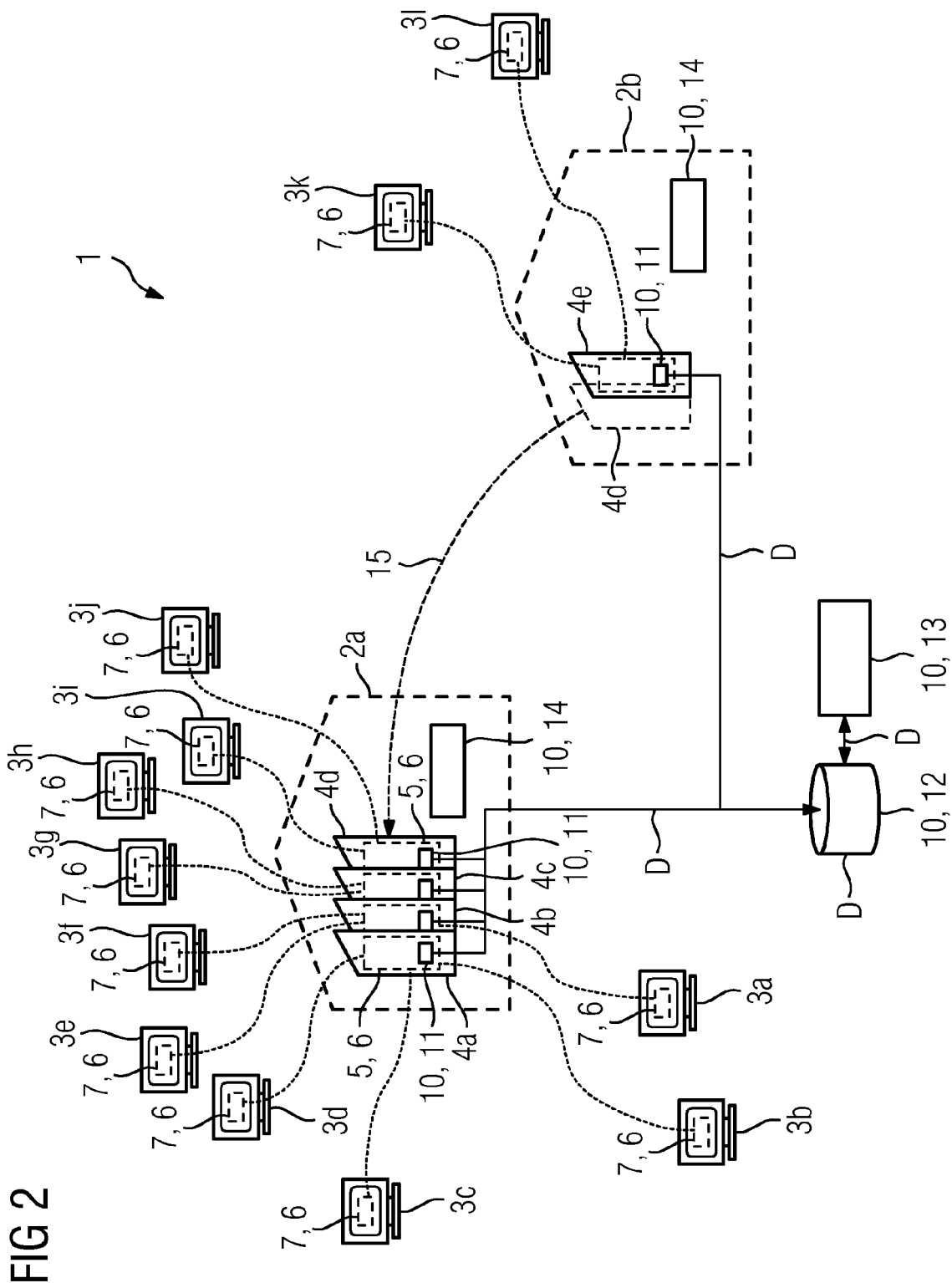
FIG. 2 shows in a diagram according to FIG. 1 the data processing network thereof in a later state following migration of a virtual server
Figure 3:
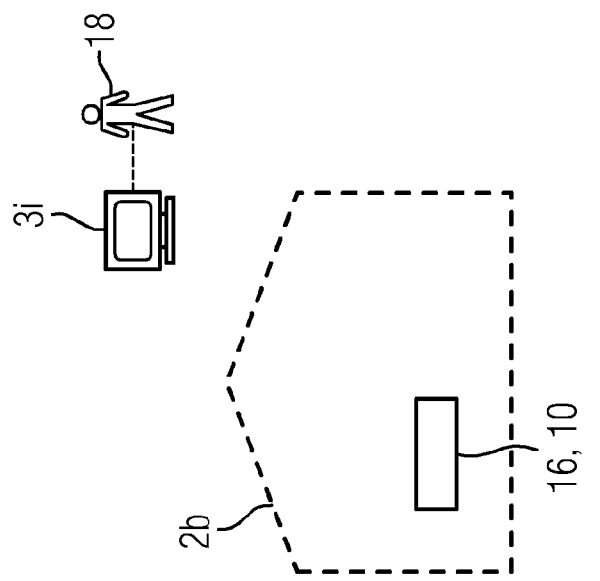
Figure 3:
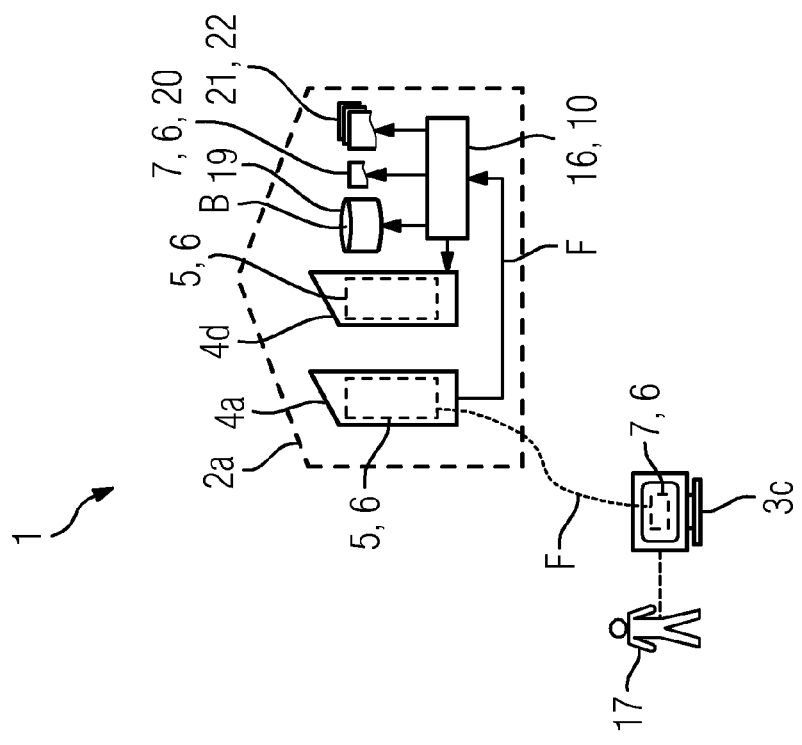

As FIG. 2 shows in comparison to the state existing before migration in FIG. 1, on the one hand utilization of the virtual servers 4a to 4c operated in data center 2a is reduced by the migration of the virtual server 4d, and this leads to a first improvement in the mean latency of data center 2a. Increasing the virtual servers 4a to 4d at data center 2a also allows the clients 3a to 3h which are geographically close to this data center 2a to locally connect to data center 2a. Long data transfer paths, as indicated in FIG. 1 by way of example by the connection between client 3j and virtual server 4d—still localized in data center 2b there—are avoided as a result, and this results in a further improvement in the mean latency. The latency of the data processing network 1 is therefore continuously improved or kept at a low level due to the ongoing gathering of access data D and the periodic creation of the latency-optimized migration plan M and its implementation by the migration control modules 14.

In addition to the above-described periodic migration of the virtual servers 4a to 4e the device 10 supports a temporary exchange of virtual servers 4a to 4e between data centers 2a and 2b for what is referred to as "Night Hawk Reading", i.e. the—based on the site of creation of the image data—nighttime diagnosis of the image data produced at one geographical location by a client user working in a different time zone. For this purpose the device 10 additionally comprises two software modules hereinafter called "workspace management modules" or "workspace management" 16 for short, of which one is allocated to data center 2a and the other to data center 2b. FIGS. 3 to 6 show in four successive snapshots the state of the data processing network 1 during execution of a corresponding (data processing) task F which a client user 17 allocated by way of example to client 3c gives to a client user 18 allocated by way of example to client 3i.

For the granting of task F the instructing client user 17 specifies by way of the application frontend 7 of its client 3c which image data is to be diagnosed, with which application or applications the diagnosis should be carried out and which medical institution or which doctor should carry out the diagnosis. In the illustrated example the instructing client user 17 specifies an image data record B, provided in a memory 19 of the data center 2a, for the diagnosis and application 6 for the diagnosis as well as client user 18 as the desired contractor. Once the task F has been acknowledged it is passed from the frontend 7 to the associated application backend 5 which then forwards the task F to the workspace management 16.

The workspace management 16 then loads the image data record B to be diagnosed from the memory 19. It also loads a virtual server (here server 4d) that is currently not required with the application backend 5 of application 6 implemented thereon. It also loads a download file 20 of the application frontend 7 and one or more configuration files 21 and templates 22 with which the application 6 is operated at the location of client 3c. The workspace management 16 packs this data and these software structures—as schematically indicated in FIG. 4—in a data environment called a workspace 23 (also called a data frame or data packet) and transmits this workspace 23 to the workspace management 16 of the data center 2 closest to the instructed client 3i.

Following receipt of the workspace 23, data center 2b executes the virtual server 4d contained therein and the application backend 5 implemented thereon and informs the instructed client user 18 about receipt of task F by way of an automatically generated email. According to FIG. 5, by way of access to the download file 20 the client user 18 can accordingly download the frontend 7 of the application 6 to its client 3i, by way of example by actuating a link contained in the email, and can connect the frontend 7 with the backend 5 of the application 6 running in the virtual server 4d. It can then diagnose the image data record B using the configuration files 21 and templates 22. The instructed client user 18 therefore has the same conditions which it would also have when logging in at the location of the instructing client user 17 but owing to the short data link to data center 2b does not have to accept long latencies for this purpose.

Once the image data record B has been diagnosed, the client user 18 creates a processing result E, in particular in the form of a medical report in this case, and confirms termination of task F. The workspace management 16 of data center 2b then returns the processing result E to the workspace management 16 of data center 2a (FIG. 6) which stores this processing result E in the memory 19 and concludes the task F. It may optionally be provided that the workspace management 16 of data center 2a informs the instructing client user 17, e.g. by way of an automatically generated email, about receipt of the processing result E.

The scope of the invention is not limited to the example embodiment described above. Instead numerous variants and developments of the described method can be found by a person skilled in the art within the scope of the invention.

To summarize, according to an embodiment of the invention access data D about the accesses of clients 3a-31 to the virtual servers 4a-4e operated in data centers 2a,2b is automatically acquired during operation of an application 6 deployed between a plurality of geographically remote data centers 2a,2b and a large number of clients 3a-31. Using the access data D a migration plan M for a latency-optimized deployment of the virtual servers 4a-4e among the data centers 2a,2b is automatically created and the virtual servers 4a-4e are migrated in accordance with migration plan M.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS

1 Data processing network
2 Data center
3a-1 Client
4a-e (Virtual) server
5 (Application) backend
6 (Software) application
7 (Application) frontend
10 Device
11 Monitoring module
12 (Access) database
13 Analysis module
14 Migration controller
15 Arrow
16 Workspace management
17 Client user
18 Client user
19 Memory
20 Download file
21 Configuration file
22 Template
23 Workspace
D Access data
M Migration plan
B Image data record
F (Data processing) task
E Processing result

What is claimed is:

1. A method for operating a data processing network including a plurality of geographically spaced-apart data centers and including a plurality of client computers, data being transmittable between each of the client computers and at least to one of the data centers, wherein one or more virtual servers are operatable in each of the data centers, the method comprising:

collecting access data in a database which includes
information on a geographical location of at least one of the client computers,
information on a geographical location of the virtual servers, and
information on a degree of utilization of the virtual servers;
analyzing the access data collected in the database at regular intervals;
creating a migration plan using a result of the analyzing, improved with respect to mean latency, for deployment of the virtual servers among the data centers; and
migrating the virtual servers between the data centers in accordance with the migration plan, wherein
a number of users registered on a called virtual server is acquired for each data processing request as information on a degree of utilization,
for executing a data processing task on a client geographically remote from an instructing data center, the data required for the processing task is combined with a virtual server and an application backend module, implemented thereon, of an application required for the processing task in a workspace unit, and the workspace unit is sent by the instructing data center to an instructed data center relatively closer to the remote client,
the virtual server contained in the workspace unit is operated in the instructed data center, and the application backend module implemented thereon is executed in communication with an application frontend module, implemented on the instructed client, of the associated application, and a processing result is sent back to the instructing data center once the processing task has been executed, and
the application backend module of a deployed software application is implementable on each virtual server, the application frontend module of the software application is implementable on each of the client computers, and the application backend module for processing data processing requests is allocated to each application frontend module.

2. The method as claimed in claim 1, the collecting of the access data includes collecting for each of a plurality of data processing requests, at least one of
at least one of an instant and duration of at least one of a data processing task, and
information on an identity of a called virtual server.

3. The method as claimed in claim 1, wherein during the analyzing with aid of the access data collected in the database
overloaded virtual servers are identified,
data centers with an over-capacity of virtual servers are identified,
data centers with an under-capacity of virtual servers are identified, and
wherein, during creation of the migration plan, virtual servers are removed from data centers with over-capacity and allocated to data centers with under-capacity.

4. The method as claimed in claim 1, wherein the data allocated to a virtual server is stored locally in the data center allocated to the virtual server.

5. The method as claimed in claim 1, wherein, in addition to the application backend module, the workspace unit contains a download file of the associated application frontend module, which is downloaded from the remote client for executing the processing task.

6. The method as claimed in claim 5, wherein the workspace unit also contains at least one configuration file with presets for at least one of the application backend module and the application frontend module, and wherein the application backend module or the application frontend module are operated at the instructed data center or the remote client using these presets.

7. A non-transitory computer readable medium including program segments for, when executed on a computer device, causing the computer device to implement the method of claim 1.

8. A device for operating a data processing network including a plurality of geographically spaced-apart data centers, and including a plurality of client computers, data being transmittable between each of the client computers and at least to one of the data centers, wherein one or more virtual servers is operateable in each of the data centers, the device comprising:

a monitoring module allocated to each data center or each virtual server, configured to collect access data which includes
information on the geographical location of at least one of the client computers,
information on the geographical location of the virtual servers and
information on a degree of utilization of the virtual servers;
a database configured to store the collected access data;
an analysis module configured to analyze the access data stored in the database at regular intervals, to create a migration plan, using a result of the analyzing, improved with respect to mean latency, for deployment of the virtual servers among the data centers, and to acquire as information on a degree of utilization the number of clients logged in with a called virtual server for each data processing request;
at least one device, configured to migrate the virtual servers between the data centers in accordance with the migration plan; and
a workspace management module configured to, for executing a data processing task on a client geographically remote from an instructing data center, combine the data required for the processing task with a virtual server and an application backend module, implemented thereon, of a software application required for the processing task in a workspace unit, and configured to send it from the instructing data center to an instructed data center relatively closer to the remote client, wherein
the application backend module of a deployed software application is implementable on each virtual server, the application frontend module of the software application is implementable on each of the client computers, and the application backend module for processing data processing requests is allocated to each application frontend module.

9. The device as claimed in claim 8, wherein the analysis module is configured to further acquire as access data for each data processing request, at least one of
at least one of an instant and duration of at least one of a data processing task, and
information on an identity of a called virtual server.

10. The device as claimed in claim 8, wherein, with aid of the access data collected in the database, the analysis module is further configured to identify overloaded virtual servers,
identify data centers with an over-capacity of virtual servers,
identify data centers with an under-capacity of virtual servers, and
wherein during creation of the migration plan, the analysis module is further configured to remove virtual servers from data centers with over-capacity and to allocate virtual servers to data centers with under-capacity.

11. The device as claimed in claim 8, wherein the at least one device configured to migrate the virtual servers is further configured to store data allocated to each server locally in the data center allocated to the server.

12. The device as claimed in claim 8, wherein, in addition to the application backend module, the workspace management module is configured to add, to the workspace unit, a download file of the associated application frontend module, downloadable by the remote client from the instructed data center for executing the processing task.

13. The device as claimed in claim 12, wherein the workspace management module is further configured to additionally add to the workspace unit at least one configuration file with presets for at least one of the application backend module and the application frontend module, with which presets the application backend module or the application frontend module is operatable at the instructed data center or the remote client.

* * * * *